United States Patent
Zhang

(10) Patent No.: US 12,008,772 B2
(45) Date of Patent: Jun. 11, 2024

(54) METHOD AND SYSTEM FOR MATCHING 2D HUMAN POSES FROM MULTIPLE VIEWS

(71) Applicant: Hinge Health, Inc., San Francisco, CA (US)

(72) Inventor: Wenxin Zhang, Montreal (CA)

(73) Assignee: HINGE HEALTH, INC., San Francisco, CA (US)

( * ) Notice: Subject to any disclaimer, the term of this patent is extended or adjusted under 35 U.S.C. 154(b) by 0 days.

(21) Appl. No.: 17/906,851

(22) PCT Filed: Mar. 20, 2020

(86) PCT No.: PCT/IB2020/052609
§ 371 (c)(1),
(2) Date: Sep. 20, 2022

(87) PCT Pub. No.: WO2021/186225
PCT Pub. Date: Sep. 23, 2021

(65) Prior Publication Data
US 2023/0215043 A1 Jul. 6, 2023

(51) Int. Cl.
*G06T 7/246* (2017.01)
*G06T 7/292* (2017.01)
(Continued)

(52) U.S. Cl.
CPC ............ *G06T 7/251* (2017.01); *G06T 7/292* (2017.01); *G06T 7/75* (2017.01); *G06V 20/52* (2022.01);
(Continued)

(58) Field of Classification Search
CPC ......... G06V 30/1904; G06V 30/19067; G06V 40/10; G06V 20/52; G06V 40/103;
(Continued)

(56) References Cited

U.S. PATENT DOCUMENTS

| 11,232,294 B1* | 1/2022 | Banerjee ................... G06T 7/73 |
| 2019/0266780 A1* | 8/2019 | Le Floch ................. G06T 15/04 |

FOREIGN PATENT DOCUMENTS

GB 2573170 A 10/2019

OTHER PUBLICATIONS

Sun et al., "People tracking in an environment with multiple depth cameras: A skeleton-based pairwise trajectory matching scheme," J. Vis. Commun. Image R. 35 pp. 36-54. (Year: 2016).*
(Continued)

*Primary Examiner* — Kenny A Cese
(74) *Attorney, Agent, or Firm* — PerkinsCoie LLP

(57) ABSTRACT

This disclosure is directed to a method and system for matching human pose data in the form of 2D skeletons for the purposes of 3D reconstruction. The system may comprise a scoring module that assigns an affinity score to each pair of cross-view 2D skeletons, a matching module that assigns optimal pairwise matches based on the affinity scores, a grouping module that assigns each 2D skeleton to a group such that each group corresponds to a unique person, based on the pairwise matches; and a temporal consistency module that assigns each group an ID that maintains correspondence to the same person over the multi-video sequence.

10 Claims, 4 Drawing Sheets

(51) Int. Cl.
  *G06T 7/73* (2017.01)
  *G06V 20/52* (2022.01)
  *G06V 30/19* (2022.01)
  *G06V 40/10* (2022.01)

(52) U.S. Cl.
  CPC .... *G06V 30/1904* (2022.01); *G06V 30/19067* (2022.01); *G06V 40/10* (2022.01); *G06V 40/103* (2022.01); *G06T 2207/10016* (2013.01); *G06T 2207/30196* (2013.01); *G06T 2207/30244* (2013.01)

(58) Field of Classification Search
  CPC ..... G06V 2201/033; G06T 7/251; G06T 7/75; G06T 7/55; G06T 7/292; G06T 2207/30244; G06T 2207/10016; G06T 2207/30196

See application file for complete search history.

(56) References Cited

OTHER PUBLICATIONS

Chang, et al. 3D Skeleton Construction by Multi-View 2D Images and 3D Model Segmentation 2011 Fourth International Conference on Ubi-Media Computing, [online] [retrieved on Dec. 4, 2020 (Apr. 12, 2020)]. Retrieved from the Internet: <https://ieeexplore.ieee.org/stamp/stamp.jsp?tp=&arnumber=5992065>; pp. 169-173, Aug. 18, 2011.

Wang, et al. Human Skeleton Tracking Using Information Weighted Consensus Filter in Distributed Camera Networks 2017 Chinese Automation Congress (CAC), [online] [retrieved on Dec. 4, 2020 (Apr. 12, 2020)]. Retrieved from the Internet: <https://ieeexplore.ieee.org/stamp/stamp.jsp?tp=&arnumber=8243598>; pp. 4640-4644, Jan. 1, 2018.

Pages, R., et al., "Affordable content creation for free-viewpoint video and VR/AR applications", Journal of Visual Communications and Image Representation, vol. 53, XP055821564, Mar. 2018, pp. 192-201.

Shaban, Muhammad, et al., "An information fusion framework for person localization via body pose in spectator crowds", Information Fusion, vol. 51, XP085685649, Nov. 2018, pp. 178-188.

* cited by examiner

METHOD AND SYSTEM FOR MATCHING 2D HUMAN POSES FROM MULTIPLE VIEWS

CROSS-REFERENCE TO RELATED APPLICATION

This application is a national stage entry of International Patent Application No. PCT/IB2020/052609, filed on Mar. 20, 2020, and titled "Method and System for Matching 2D Human Poses from Multiple Views," which is incorporated by reference herein in its entirety.

FIELD

This disclosure relates to identifying and tracking 2D joint skeletons in video segments. More particularly, this disclosure relates to matching 2D skeletal data corresponding to the same person where the 2D data is extracted from frames of video segments taken from multiple viewpoints.

BACKGROUND

Reconstruction of 3D human poses from synchronized 2D video sequences may be accomplished in two stages. The first stage, 2D human pose estimation, detects keypoints in each frame of each video sequence. The second stage fuses the 2D keypoints, along with the camera calibration parameters, into 3D skeletons.

2D human pose estimators may rely on deep neural networks to detect keypoints, which may correspond to anatomical joints, in each video frame of a video sequence. A group of keypoints belonging to a single person may be connected to form a 2D skeleton. For scenes containing multiple persons, multiple 2D skeletons may be detected in each frame, and each is assigned an index or unique ID. Multi-person pose estimation may be accomplished by performing keypoint detection on multiple regions of interest, or it may be accomplished by detecting all keypoints in a single image frame jointly in "one shot" and then grouping them into individual 2D skeletons.

For each person in the scene, 2D skeletons that correspond to the specific person are grouped together and the 3D skeleton is estimated through a data fusion technique. For instance, each 3D joint position may be independently estimated by triangulation of 2 or more keypoints. Alternatively, 3D joint positions may be estimated by Kalman Filters that model the motion of the joints over time.

For scenes containing multiple persons, it may be important that 2D skeletons be grouped such that each group corresponds to a single person. Because the 2D skeletons in each view may be extracted independently, their indices or IDs are not correlated across views. Accordingly, a matching step is typically used to identify the 2D groups that get fused in order to recover the 3D skeletons.

SUMMARY

This disclosure relates in an aspect to a method of identifying humans between two or more camera views from 2d skeletons of the humans of each view. The method includes for each skeleton in each of the two or more camera views, performing a pairwise scoring with each of the skeletons in another of the two or more camera views and assign an affinity score to each pair. The method also includes identifying a best match of a skeleton in a first camera view to a skeleton in a second camera view by maximizing the affinity score of the pair. The method includes grouping skeletons by identifying a set of skeletons in a first camera view, the set relating to the humans in the first camera view, with a set of skeletons in a second camera view using the best match.

In an aspect, this disclosure relates to a motion capture system for two or more humans comprising two or more calibrated cameras generating synchronized video streams, each camera having an overlapping field of views that include the two or more humans. The system has a 2D pose estimator module associated with each of the two or more calibrated cameras for generating a 2D skeletons for each human in the field of view of the camera for a frame of the video stream and a scoring module for perform a pairwise scoring for each of the 2D skeletons associated with a first camera with each 2D skeleton of another of the two or more cameras and assigning an affinity score to each pair. The system also has a matching module that matches a 2D skeleton in a first camera view to a 2D skeleton in a second camera view by maximizing the affinity score of the pair and a grouping module that groups 2D skeletons by identifying a set of 2D skeletons for each person, respectively, in the captured scene such that each 2D skeleton in a group corresponds to a view of the respective person in a given camera view. The system also includes a temporal matching module that assigns an identifier to each 2D skeleton group that remains consistent across a sequence of frames of the video streams and a 3D reconstruction module that combines the grouped 2D skeleton across a sequence of frames for a human to create a 3D skeleton of the human, capturing the position of the human.

BRIEF DESCRIPTION OF THE DRAWINGS

In drawings which illustrate by way of example only an embodiment of the disclosure.

DETAILED DESCRIPTION

This disclosure is directed to a method and system for matching human pose data in the form of 2D skeletons for the purposes of 3D reconstruction. The system may comprise a scoring module 20 that assigns an affinity score to each pair of cross-view 2D skeletons, a matching module 30 that assigns optimal pairwise matches based on the affinity scores, a grouping module 50 that assigns each 2D skeleton to a group such that each group corresponds to a unique person, based on the pairwise matches; and a temporal consistency module 60 that assigns each group an ID that maintains correspondence to the same person over the multi-video sequence.

Figure 1:
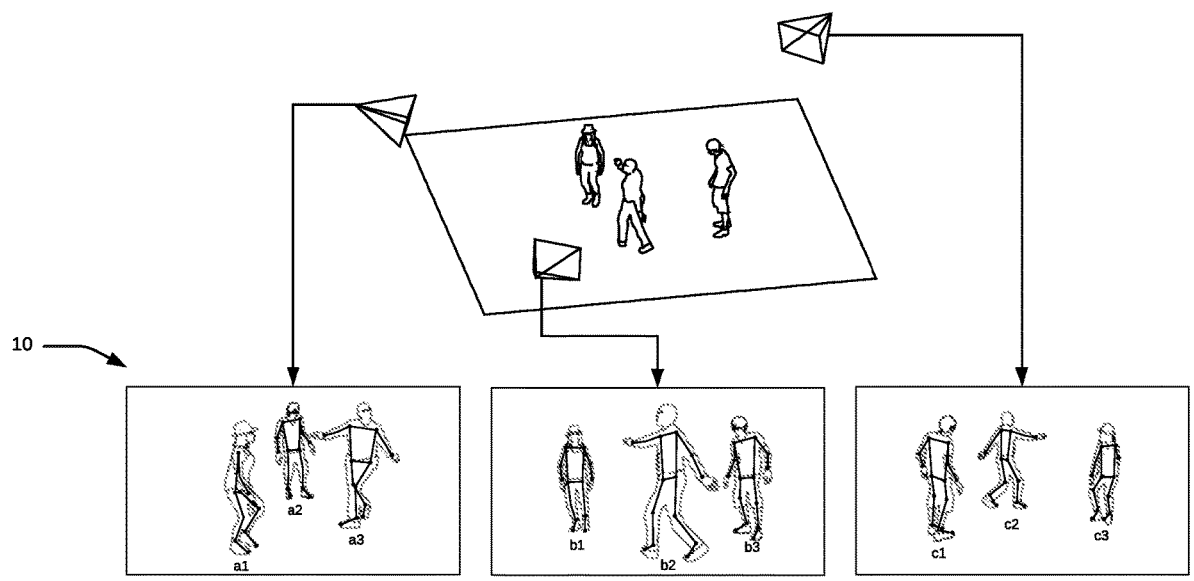
FIG. 1 is an exemplary pictorial representation of 2D skeleton data derived from three video sequences, in accordance with an embodiment.

With reference to FIG. 1, 2D skeleton data 10 is extracted from two or more video sequences, taken from calibrated cameras. To perform 3D reconstruction, the 2D skeletons may be matched across views. A calibrated camera is preferably a camera for which field of view, angle and location information is known. The two or more video sequences are preferably synchronized so that each of the video sequences include the same period of time and include at least some of the same humans/skeletons. In some instances, one or more humans/skeletons may leave the field of view of one or more of the cameras.

A 2D human pose estimator may generate 2D skeletons for each human in each of the two or more video sequences. This may be done using known techniques, such as using a convolutional neural network (CNN), including such as by Wrnch.AI. A sequence of 2D skeletons may be provided corresponding to the video sequences for each camera.

Figure 2:
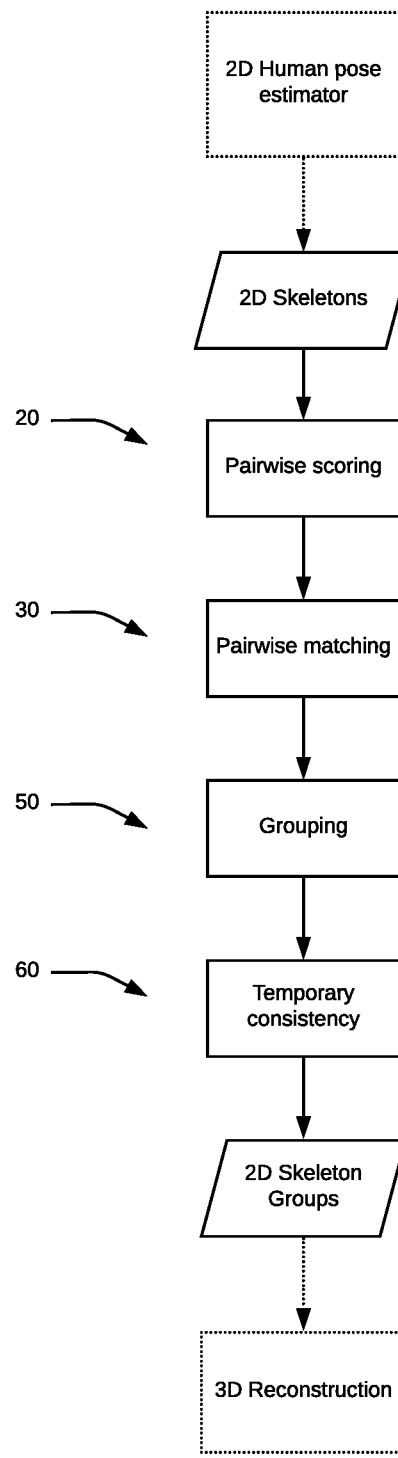
FIG. 2 is a block diagram of a system for matching 2D human poses, in accordance with an embodiment.

With reference to FIG. 2, the 2D matching system may comprise the following modules: the pairwise scoring module 20, the pairwise matching module 30, the grouping module 40, and the temporal consistency module 50. The pairwise-score module 20 may assign an affinity score to each possible combination of cross-view pairs of 2D skeletons. A cross-view pair of 2D skeleton is any pair of skeletons where one skeleton is from a first video sequence and the second is from a second video sequence. The affinity score of a given pair of 2D skeletons correlates to the likelihood that the pair belong to the same person. In a preferred embodiment, the affinity score may be a weighted sum of several metrics based on the concept of "approximate triangulations" of cross-view keypoint pairs, as described below.

An approximate triangulation is computed by projecting a ray through each of the two keypoints. A keypoint of a 2D skeleton may be one particular element such as the centre of the head, centre of the pelvis, right or left wrist. Assuming a pinhole camera model, each ray is modelled as originating at the respective camera's optical center, based on the parameters known of the camera such as its location, angle and field of view, and proceeding in the direction that passes through the keypoint on the virtual image plane. This is done for the same keypoint, for example the centre of the head, for the two skeletons being compared, one arising from a first camera and video sequence and one arising from the second camera and video sequence. The triangulation point is the point in 3-space with a minimum Euclidean distance between the two rays. The triangulation error may be the minimum distance between the two rays. If the triangulation point is determined to be behind the cameras, the rays are diverging and this point may not be considered in the score calculations. In some embodiments, this may be done for more than one keypoint pairs.

One affinity score metric may be the total count of "inlier" keypoint pairs for the set of approximate triangulations for the given pair of 2D skeletons, where in inlier pair may be defined as a keypoint pair with a triangulation error below a certain threshold. For instance, a pair of 2D skeletons {A, B} may have a total of 7 inlier pairs out of a possible 8 (the pair corresponding to the left wrist joint is not considered an inlier because of high triangulation error), and another pair of skeletons {A, C} may have a total of 6 inlier pairs out of a possible 8 (the pairs corresponding to the right ankle and head joints respectively are not considered inliers). In this instance, {A, B} may score higher on the inlier metric of the weighted affinity score than {A, C}. Another metric may be the average triangulation error of all the pairs of keypoints belongs to the two skeletons. Another metric may be the "human-ness" of a putative 3D skeleton reconstruction consisting of all inlier triangulation points. The human-ness metric may be inversely proportional to the deviation of the limb lengths of the putative skeleton from those of an average person, based on anthropometric data. For instance, a putative 3D skeleton derived from a mismatched pair of 2D skeletons may have limbs that may be double the length of an average person, and thus may have a lower human-ness metric than a pair of correctly matched skeletons.

Figure 3:
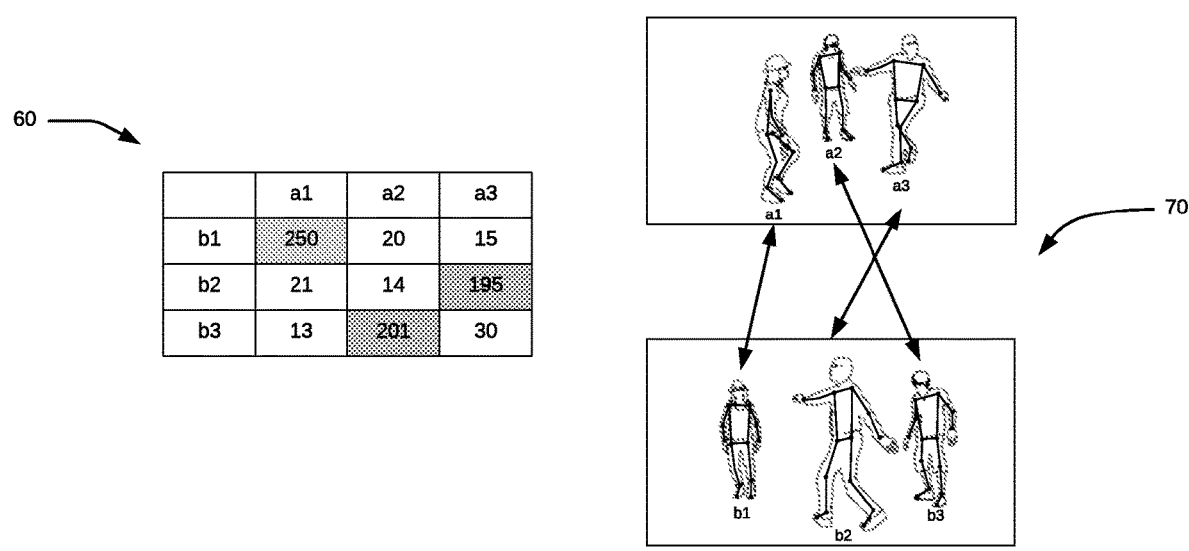
FIG. 3 is an exemplary table of affinity scores for a pair of views, and the matching pairs produced by the pairwise matching module, in accordance with an embodiment.

With reference to FIG. 3, the pairwise-matching module 30 may examine in turn all the cross-view affinity scores 60. In other words, the affinity score for each pair of skeletons, a first skeleton from a first camera and a second skeleton from a second camera. The module may find a set of one-to-one matches between the 2D skeletons in the two views that maximizes the affinity score 70. This may be solved by using an assignment method such as the Hungarian algorithm, the primal simplex algorithm, or the auction algorithm. To handle the case where no matches are made (for instance, when the two views capture disjoint sets of persons), an embodiment may suppress matches whose affinity scores fall below a threshold. This process may be repeated for all pairs of camera views.

Figure 4:
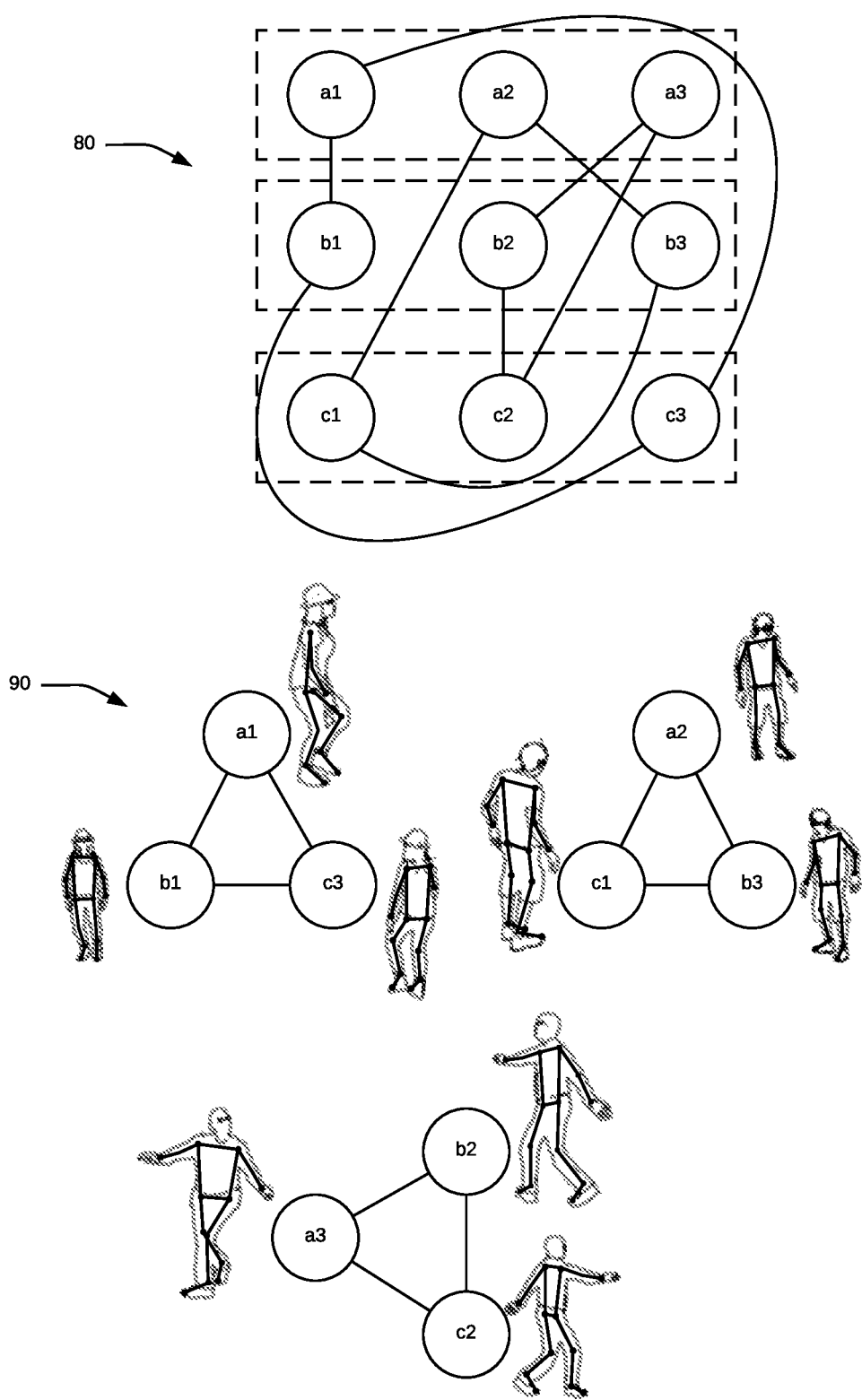
FIG. 4 is an exemplary graph of pairwise matches, and the connected components or cycles that represent groups that each correspond to a unique person.

The grouping module 50 may take the set of pairwise matches and outputs N sets of 2D skeletons, where N is the number of distinct people in the scene and each set corresponds to a distinct person in the scene. With reference to FIG. 4, the procedure for this grouping may be as follows. An undirected graph 80 may be first constructed where each 2D skeleton is associated with a vertex, and each pairwise match is an edge. Next, the graph is partitioned into subgraphs 90 such that each subgraph's vertices comprise 2D skeletons that belong to the same person. The subgraphs may be connected components or biconnected components, and these subgraphs may be extracted using a standard depth-first search method.

The temporal matching module 60 may assign an ID to each 2D skeleton group, such that each person's ID remains consistent over the video sequences. An embodiment may achieve this by reprojecting the 3D skeletons from a previous timestep according to the camera parameters to create a set of predicted 2D skeletons in a current timestep. The pixel distance to each 2D skeleton group from the 2D skeleton projections of the previous timestep may be computed, and a matching method such as Hungarian algorithm is used to generate a one-to-one correspondence between the set of extant 3D skeletons and the 2D skeleton groups such that the pixel distances are minimized. The 2D groups may then be assigned IDs that correspond to the indices of the extant 3D skeletons. This may be continued for each timestep of the video sequence.

The system modules described may be separate software modules, separate hardware modules, or portions or one or more hardware components. The functionality of the modules described above may be implemented in a single system or provided in separate modules similar to or different from the modules described.

The software modules may consist of instructions written in a computer language such as C++ or assembly code and run on computer hardware such as a CPU, or they may be implemented on an FPGA. The software may utilize storage, such as RANI or magnetic storage, such as one or more hard drives. The system may run on a desktop computer, mobile phone or another platform that includes suitable memory for holding the software, data and skeletons parameters.

In an embodiment, the human matching system may comprise part of a motion capture system which digitizes the 3D poses of two or more humans subjects, such as in real time or post processing. This digitized pose data may be used for such applications as performance capture for digital media, or for sport analytics. Two or more calibrated cameras may be synchronized and their video streams captured and processed by 2D pose estimator systems, such as one for each video stream. The matching system may receive the output 2D skeletons from the 2D pose estimators, such as through a network interface or computer bus. The matched 2D skeleton groups may then be provided to a 3D reconstruction module, which fuses the 2D keypoints for each person in the scene to obtain the 3D pose data for each skeleton.

Various embodiments of the present disclosure having been thus described in detail by way of example, it will be apparent to those skilled in the art that variations and modifications may be made without departing from the disclosure. The disclosure includes all such variations and modifications as fall within the scope of the appended claims.

The invention claimed is:

1. A method of identifying humans between two or more camera views from two-dimensional (2D) skeletons of the humans of each view, the method comprising:
   a) for each 2D skeleton in each of the two or more camera views, performing a pairwise scoring with each of the 2D skeletons in another of the two or more camera views and assigning an affinity score to each pair, wherein the pairwise scoring of a pair of 2D skeletons from a pair of camera views comprises:
      for each element of multiple elements,
         modelling a pair of rays from the pair of camera views to that element of the 2D skeleton,
         determining a distance between the pair of rays, and
         generating the affinity score that is representative of a weighted sum of the multiple distances determined for the multiple elements;
   b) identifying a best match of a first 2D skeleton in a first camera view to a second 2D skeleton in a second camera view by maximizing the affinity score of the pair; and
   c) grouping the 2D skeletons by identifying a first set of 2D skeletons in the first camera view, the first set of 2D skeletons relating to the humans in the first camera view, with a second set of 2D skeletons in the second camera view using the best match.

2. The method of claim 1 wherein if the rays are divergent, the pair is not included in the affinity score.

3. The method of claim 1 wherein the pairwise scoring of a pair of 2D skeletons from a pair of camera views further comprises excluding elements where the distance between the pair of rays exceeds a threshold.

4. The method of claim 1 wherein the pairwise scoring of a pair of 2D skeletons from a pair of camera views further comprises determining a deviation of attributes of a putative three-dimensional (3D) skeleton formed from the pair of 2D skeletons from a typical human.

5. The method of claim 1 further comprising calibrating each camera view by determining a position and an angle of a corresponding camera, and synchronizing the camera view by aligning frames taken at the same time from the one or more camera views.

6. A non-transitory, computer-readable medium with instructions that, when executed by a system, cause the system to perform operations comprising:
   obtaining two-dimensional (2D) skeletons of humans in multiple camera views of a given environment;
   for each 2D skeleton in each of the multiple camera views, performing a pairwise scoring with each of the 2D skeletons in another of the multiple camera views and assigning an affinity score to each pair, wherein the pairwise scoring of a pair of 2D skeletons from a pair of camera views comprises:
      for each element of multiple elements of the 2D skeleton,
         modelling a ray from each camera view to that element of the 2D skeleton,
         determining a distance between the pair of rays, and
         generating the affinity score that is representative of a weighted sum of the multiple distances determined for the multiple elements;
   identifying a best match of a first 2D skeleton in a first camera view to a second 2D skeleton in a second camera view by maximizing the affinity score of the pair; and
   grouping the 2D skeletons by identifying a first set of skeletons in the first camera view, the first set of skeletons relating to humans in the first camera view, with a second set of skeletons in the second camera view using the best match.

7. The non-transitory, computer-readable medium of claim 6 wherein if the rays are divergent, the pair is not included in the affinity score.

8. The non-transitory, computer-readable medium of claim 6 wherein the pairwise scoring of a pair of 2D skeletons from a pair of camera views further comprises excluding elements where the distance between the pair of rays exceeds a threshold.

9. The non-transitory, computer-readable medium of claim 6 wherein the pairwise scoring of a pair of 2D skeletons from a pair of camera views further comprises determining a deviation of attributes of a putative three-dimensional (3D) skeleton formed from the pair of 2D skeletons from a typical human.

10. The non-transitory, computer-readable medium of claim 6 further comprising calibrating each camera view by determining a position and an angle of a corresponding camera, and synchronizing the camera view by aligning frames taken at the same time from the multiple camera views.

* * * * *